United States Patent
Auer et al.

(10) Patent No.: US 9,587,082 B2
(45) Date of Patent: Mar. 7, 2017

(54) COMPOSITION FOR A DISC-TYPE FLEXIBLE COUPLING AND COUPLING INCLUDING SUCH COMPOSITION

(71) Applicant: TUMEDEI SPA, Ala (IT)

(72) Inventors: Martin Auer, Waldkraiburg (DE);
Olivier Marin, Cavaion Veronese (IT);
Ron Asquith, Sydney (AU); John Sprod, Sydney (AU)

(73) Assignee: TUMEDEI SPA (IT)

(*) Notice: Subject to any disclaimer, the term of this patent is extended or adjusted under 35 U.S.C. 154(b) by 0 days.

(21) Appl. No.: 14/653,216

(22) PCT Filed: Dec. 17, 2013

(86) PCT No.: PCT/IB2013/061020
§ 371 (c)(1),
(2) Date: Jun. 17, 2015

(87) PCT Pub. No.: WO2014/097136
PCT Pub. Date: Jun. 26, 2014

(65) Prior Publication Data
US 2015/0337904 A1  Nov. 26, 2015

(30) Foreign Application Priority Data
Dec. 19, 2012  (IT) .............................. VR2012A0245

(51) Int. Cl.
*F16D 3/78* (2006.01)
*C08L 7/00* (2006.01)
(Continued)

(52) U.S. Cl.
CPC ................. *C08K 3/04* (2013.01); *C08K 7/02* (2013.01); *C08L 7/00* (2013.01); *C08L 9/00* (2013.01);
(Continued)

(58) Field of Classification Search
CPC .... C08K 3/04; C08K 7/02; C08L 7/00; C08L 9/00; C08L 77/00
See application file for complete search history.

(56) References Cited

U.S. PATENT DOCUMENTS

| 4,738,650 A | 4/1988 | Hojo et al. |
| 5,562,545 A | 10/1996 | Wähling et al. |

(Continued)

FOREIGN PATENT DOCUMENTS

| CN | 101 724 183 | 6/2010 |
| CN | 102 705 439 | 10/2012 |

(Continued)

OTHER PUBLICATIONS

International Search Report dated Mar. 24, 2014 issued in corresponding International patent application No. PCT/IB2013/061020.

*Primary Examiner* — Vu A Nguyen
(74) *Attorney, Agent, or Firm* — Ostrolenk Faber LLP

(57) ABSTRACT

A composition having at least one rubber component; from 49 to 51 parts of carbon black per hundred parts of the at least one rubber component; from 1 to 6 parts of modified para-aramid short fiber per hundred parts of the at least one rubber component; and from 1 to 6 parts of hexamethylene-1,6-bis(thiosulfate) disodium salt dehydrate per hundred parts of the at least one rubber component.

8 Claims, 5 Drawing Sheets

(51) Int. Cl.
*C08L 9/00* (2006.01)
*C08L 77/00* (2006.01)
*C08K 3/04* (2006.01)
*C08K 7/02* (2006.01)
*C08L 21/00* (2006.01)
*F16D 3/62* (2006.01)
*C08K 5/41* (2006.01)
*C08L 77/10* (2006.01)

(52) U.S. Cl.
CPC ............... *C08L 21/00* (2013.01); *C08L 77/00* (2013.01); *F16D 3/62* (2013.01); *F16D 3/78* (2013.01); *C08K 5/41* (2013.01); *C08L 77/10* (2013.01)

(56) References Cited

U.S. PATENT DOCUMENTS

| | | |
|---|---|---|
| 6,068,555 A | 5/2000 | Andrä et al. |
| 2007/0080534 A1 | 4/2007 | Rothe et al. |
| 2009/0149576 A1 | 6/2009 | Frances et al. |
| 2009/0151840 A1* | 6/2009 | Lechtenboehmer ...... B60C 1/00 152/458 |
| 2011/0086735 A1 | 4/2011 | Takahashi et al. |
| 2011/0092296 A1 | 4/2011 | Rothe et al. |
| 2011/0190067 A1 | 8/2011 | Brandl et al. |
| 2012/0094774 A1 | 4/2012 | Brandl et al. |
| 2012/0152423 A1 | 6/2012 | Zhao et al. |

FOREIGN PATENT DOCUMENTS

| | | |
|---|---|---|
| DE | 41 06 945 A1 | 9/1991 |
| DE | 10 2004 029989 A1 | 1/2006 |
| GB | 752 815 | 7/1956 |
| JP | 2000 301908 | 10/2000 |
| JP | 2006 125630 | 5/2006 |
| JP | 2011 241248 | 12/2011 |
| KR | 2010 0035236 | 4/2010 |
| KR | 2012 0058698 | 6/2012 |

* cited by examiner

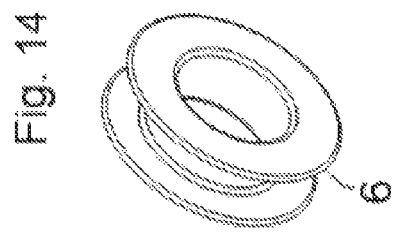
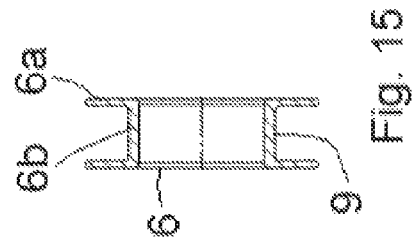
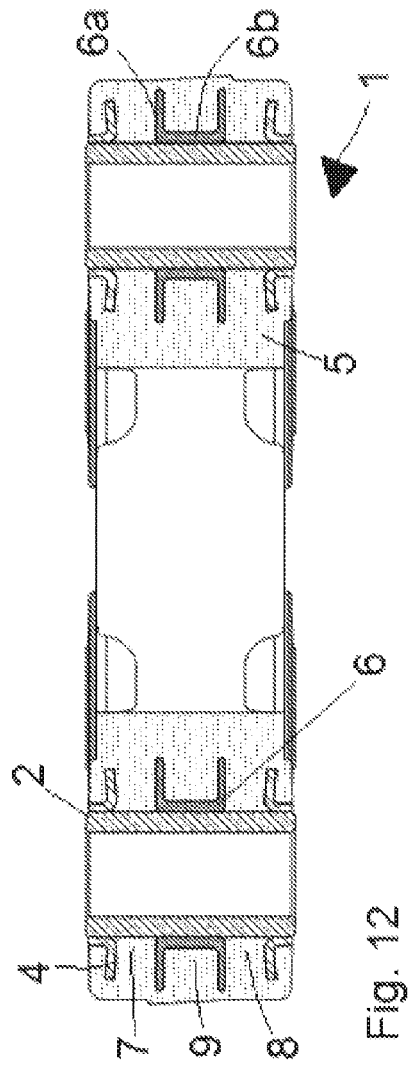
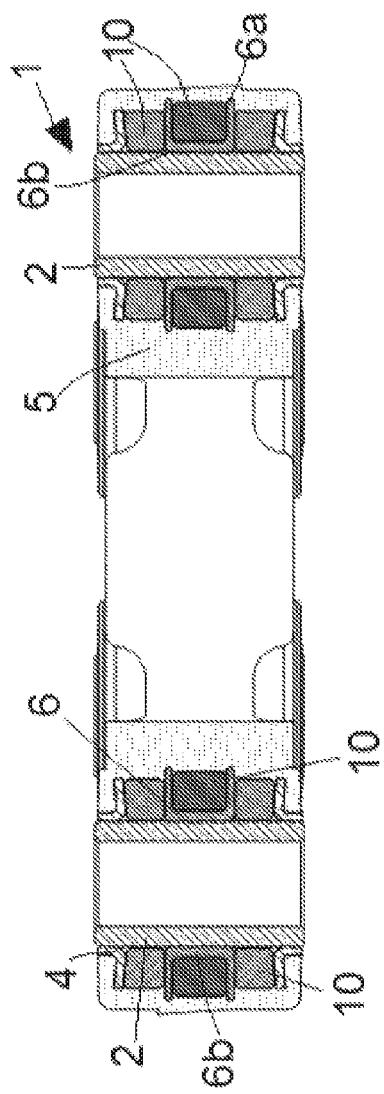

US 9,587,082 B2

COMPOSITION FOR A DISC-TYPE FLEXIBLE COUPLING AND COUPLING INCLUDING SUCH COMPOSITION

CROSS REFERENCE TO RELATED APPLICATIONS

The present application is a 35 U.S.C. §371 National Phase conversion of PCT/IB2013/061020, filed Dec. 17, 2013, which claims benefit of Italian Application No. VR2012A000245, filed Dec. 19, 2012, the disclosure of which is incorporated herein by reference. The PCT International Application was published in the English language.

TECHNICAL FIELD OF THE INVENTION

The present invention relates to a composition for a disc-type flexible coupling designed to connect a driving and a driven shaft end to end. A coupling according to the present invention is particularly useful in the automotive field.

BACKGROUND OF THE INVENTION

A disc-type flexible couplings are known in the art. The two shafts to be connected by a disc-type coupling are each provided with a boss, also termed spider, having three extensions set at 120° one with respect to the other. The disc has six through holes or bushings for bolting equally angularly spaced from one another. The spider extensions on each shaft are bolted to the disc, but at different angular positions from those on the other shaft. A "yield" or "give" occurs, in use, when power is transmitted from one shaft to the other. This is the case in particular with rear wheel drive (RWD) vehicles, where propeller shaft or propshaft and gearbox and/or differentials are to be connected through couplings. Each bushing is connected to the adjacent ones through rubber and canvas or yarns bonded together, the yarns being wound around each couple of adjacent bushings and buried or incorporated in the rubber.

A flexible coupling constitutes a yielding intermediate element that, besides absorbing impact or shock due to irregularities in the motion of the driving shaft, allows small amounts of parallel and/or angular movement of one shaft with respect to the other. Of course, the rubber composition plays a substantial role in so far as efficiency, noise vibration and harshness (NVH) production and reliable/durable torque transmission even at relatively high temperatures, i. e. up to 120° C., are concerned.

SUMMARY OF THE INVENTION

The main object of the present invention is to provide a new composition particularly suitable for disc-type flexible couplings that ensures low noise vibration and harshness and withstands relatively high working temperatures.

Another object of the present invention is to provide a composition with improved heat resistance and desired flex fatigue properties when used in a rubber flex coupling.

Another object of the present invention is to provide a composition that is easy to be obtained and cost effective.

Another object of the present invention is to provide a new flexible disc-type coupling for connecting a propshaft or driving shaft and a gearbox and/or a differential, particularly in rear wheel drive vehicles.

According to a first aspect of the present invention, a composition is provided, which comprises:

at least one rubber component;
from 49 to 51 parts of carbon black per hundred parts of the at least one rubber component;
from 1 to 6 parts of modified para-aramid short fibre per hundred parts of the at least one rubber component; and
from 1 to 6 parts of hexamethylene-1,6-bis(thiosulfate), disodium salt, dehydrate per hundred parts of the at least one rubber component.

Advantageously, the composition comprises:
at least one rubber component;
50 parts of carbon black per hundred of the at least one rubber component;
3 parts of modified para-aramid short fibre per hundred parts of the at least one rubber component; and
3 parts of hexamethylene-1,6-bis(thiosulfate), disodium salt, dehydrate per hundred parts of the at least one rubber component.

More advantageously, the rubber component is selected from the group including polyisoprene, natural rubber or their mixtures.

According to another aspect of the present invention, a method of obtaining the above-mentioned composition is provided, comprising the following steps:

mixing a rubber component, carbon black, and modified para-aramid short fibre; and
subsequently mixing the mixture thus obtained with hexamethylene-1,6-bis(thiosulfate), disodium salt, dehydrate.

According to another aspect of the present invention, a flexible disc-type coupling is provided, which comprises a disc body having a plurality of bushings, which are angularly spaced apart one with respect to the other along a circumference, each pair of adjacent bushings being connected by yarns wound around them, the bushings and the yarns being incorporated in a matrix of a composition according to the present invention.

BRIEF DESCRIPTION OF THE DRAWINGS

Further aspects and advantages of the present invention will become clearer from the following detailed description of specific embodiments of a composition and a coupling, the description being made with reference to the accompanying drawings, in which:

FIGS. 12 and 13 are diametric cross-section views of another coupling according to the present invention;

FIG. 14 is a perspective view of a component of the coupling of FIGS. 12 and 13; and FIG. 15 is a cross-section view of the component of FIG. 14.

DESCRIPTION OF PREFERRED EMBODIMENTS

Figure 1:
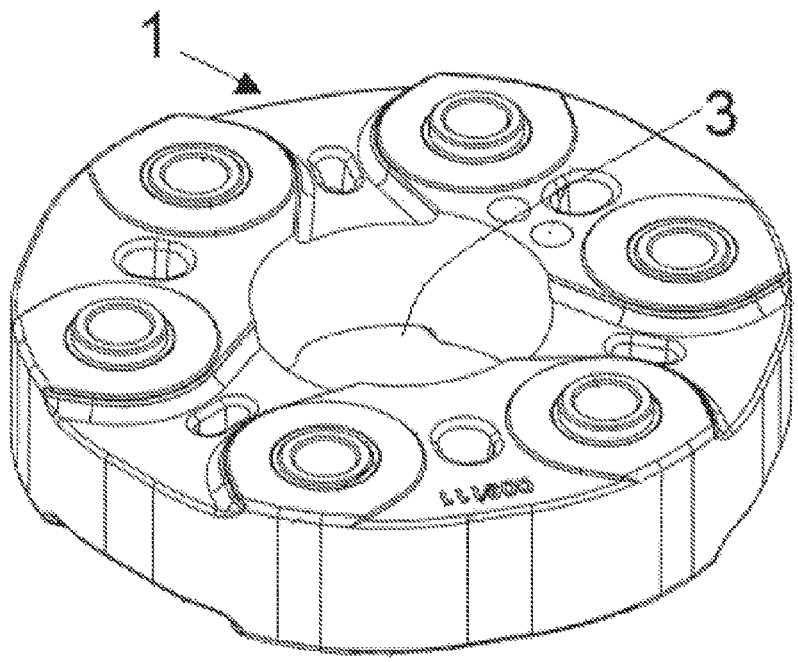
FIG. 1 shows a diagrammatic perspective view of a flexible disc-type coupling according to present invention.

In the drawings, equivalent or similar parts or components were marked with the same reference numerals.

The present invention relates to a composition or formulation (1616/10) preferably including polyisoprene incorporating:
modified para-aramid short fibres, such as a compound traded under the name of "Sulfron 3001" obtainable from Teijin;
carbon black; and
hexamethylene-1,6-bis(thiosulfate), disodium salt, dehydrate, such as the compound traded under the name "Duralink" obtainable from Flexsys;
Owing to the presence of para-aramid fibres and hexamethylene-1,6-bis(thiosulfate), disodium salt, dehydrate, the composition of the present invention makes it possible to obtain, among the other things, a flexible disc-type coupling having improved heat resistance and better flex fatigue properties, and a long useful life.

In so far as carbon black is concerned, it acts as reinforcing agent in the rubber formulation.

In the following Table 1, the components of a composition according to the present invention, together with the respective tolerances, are indicated.

TABLE 1

| INGREDIENTS/COMPONENTS | P.P.H.R. | Tolerance |
|---|---|---|
| MB 1616/10 | | |
| POLYISOPRENE/NIPOL IR 2200 | 100 | |
| N110 CARBON BLACK | 50 | +/−1% |
| SULFRON 3001 | 3 | 1-6 parts |
| Other | 15.5 | +/−1% |
| MB 1616/10 | 168.5 | |
| FINAL MIX ON MILL | | |
| MB 1616/10 | 168.5 | |
| Other | 3.0 | +/−1% |
| DURALINK HTS | 2.5 | 1-6 parts |
| TOTAL: | 174 | |
| SPECIFICATION | | |
| Hardness Shore A | 63 ± 3 | 62 |
| Tensile Strength Mpa | 21 Min. | 24.3 |
| Elongation % | 400 Min | 620 |
| Tear kN/m | 26 Min | 85 |
| Specific Gravity | | 1.10 |

P.P.H.R. means parts per hundred parts of polyisoprene.

Although in a composition according to the present invention, polyisoprene is preferred, it can be replaced by all sort of rubber component and elastomers, preferably by natural rubber (which is chemically equivalent to polyisoprene) or EPDM without departing from the scope of the present patent application.

For MB 1616/10, others can be selected from the group including: stearic acid 1.5%, Zinc oxide (ZnO) 4%, Antilux 654 1.5%, 6PPD 1.5%, IPPD 1%, TMQ 1%, and Sunflex process oil 5%, whereas for final mixture others can be selected from Sulphur 1% and CBS 2%.

Percentages are measured in parts per hundred parts of rubber component, such as polyisoprene by weight.

A composition according to the present invention has been subjected to a number of tests, and the result thereof are shown in the following Table 2.

TABLE 2

| test | test method | Specification Specification | 1616/2 (polyisoprene) Elastomer | 1616/10 |
|---|---|---|---|---|
| Trouser Tear | DIN ISO 34-1-1A | 15 N/m | 21 | 38 |
| Angle Tear + Nick | DIN ISO 34-1-1B | 25 N/m | 55 | 92 |
| Thermal Ageing 42 d @ 85 C. | VDA 675 310 | | | |
| Change in Shore A hardness | ISO 898 | +10 | 9 | 8 |
| Tensile strength Min. | ISO 37 | 12 MPa +6 | 19 | 17.5 |
| Change in tensile strength Max. | ISO 37 | −40% | −37 | −31 |
| Elongation at break Min. | ISO 37 | 200% | 360 | 403 |
| Change in Elongation at break | ISO 37 | −50% | −42 | −35 |
| Thermal Ageing 10 min @ 165 C. | | | | |
| Tear kN/m | D624 | — | 67 | 88 |

From such table and from graphs shown in FIGS. 7 to 11, it is derivable that the composition according to the present invention (1616/10) has improved rubber tear strength with respect to a composition according to the prior art (1616/2), and as it is known, this is important for fatigue life of rubber to prevent cracking in a respective coupling.

The composition indicated as 1616/2 includes synthetic NR or polyisoprene.

Moreover, the composition according to the present invention has also better heat resistance than prior art composition, and this is derivable from the change at day number 42 in tensile properties/hardness.

As indicated above, a composition according to the present invention can and is preferably used for obtaining a component for a coupling designed to drivingly connect shafts to one another, e. g. for connecting the propshaft and gearbox and/or differentials in rear wheel drive (RWD) vehicles.

A rubber coupling 1 according to present invention comprises a plurality of bushings 2, preferably steel bushing, which are angularly spaced apart one with respect to the other and located along a circumference extending about a central opening 3. Each bushing 2 is connected to the adjacent ones through yarns 10 (see FIG. 13), preferably made of nylon, wound around the bushing side walls. More particularly, the nylon yarn loops are wound around the steel bushings 2 and retained by steel collars 4, preferably two steel collars 4 mounted each at one end of the respective bushing 2.

The bushings and the yarns are buried in a composition 5 according to the present invention.

More particularly, each nylon yarn is wound into a loop and assembled into a nest (i. e. yarns constructed to overlap as "nest") of forward and reverse loops in line with the vehicle torque and vehicle direction of movement. The thus-obtained component is then over-moulded with polyisoprene rubber formulation 1616/10. Preferably, a coupling according to the present invention comprises: 9× nylon loops, 6× steel bushings, 12× steel collars and rubber.

The key feature of the flex coupling according to the present invention is the inclusion of polyisoprene rubber formulation or composition.

Figure 3:
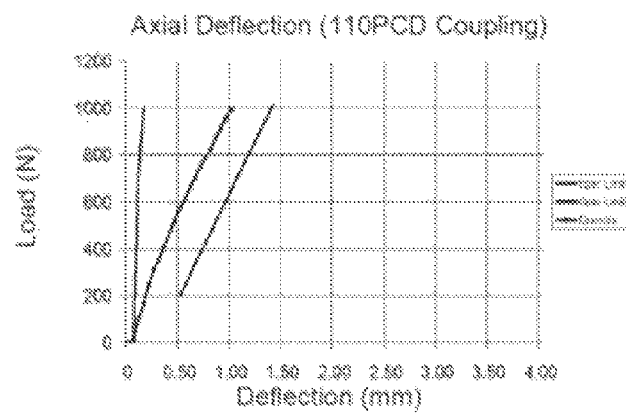
FIGS. 3 to 5 show a respective graph relating to test results on a flexible disc-type coupling according to the present invention.
Figure 4:
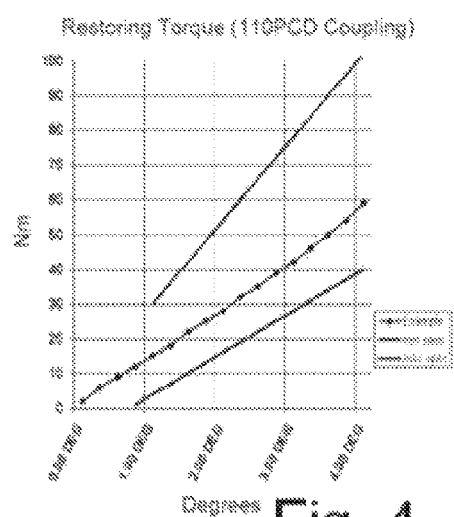
Figure 5:
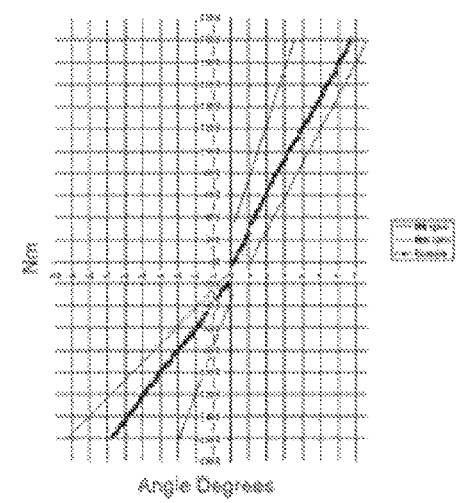

As indicated above, a rubber coupling component according to the present invention has better flex fatigue properties and improved heat resistance than prior art coupling components owing to its composition including polyisoprene, modified para-aramid short fibres, and hexamethylene-1,6-bis(thiosulfate), disodium salt, dehydrate. This is shown in the graphs of FIGS. 3 to 5.

Figure 6:
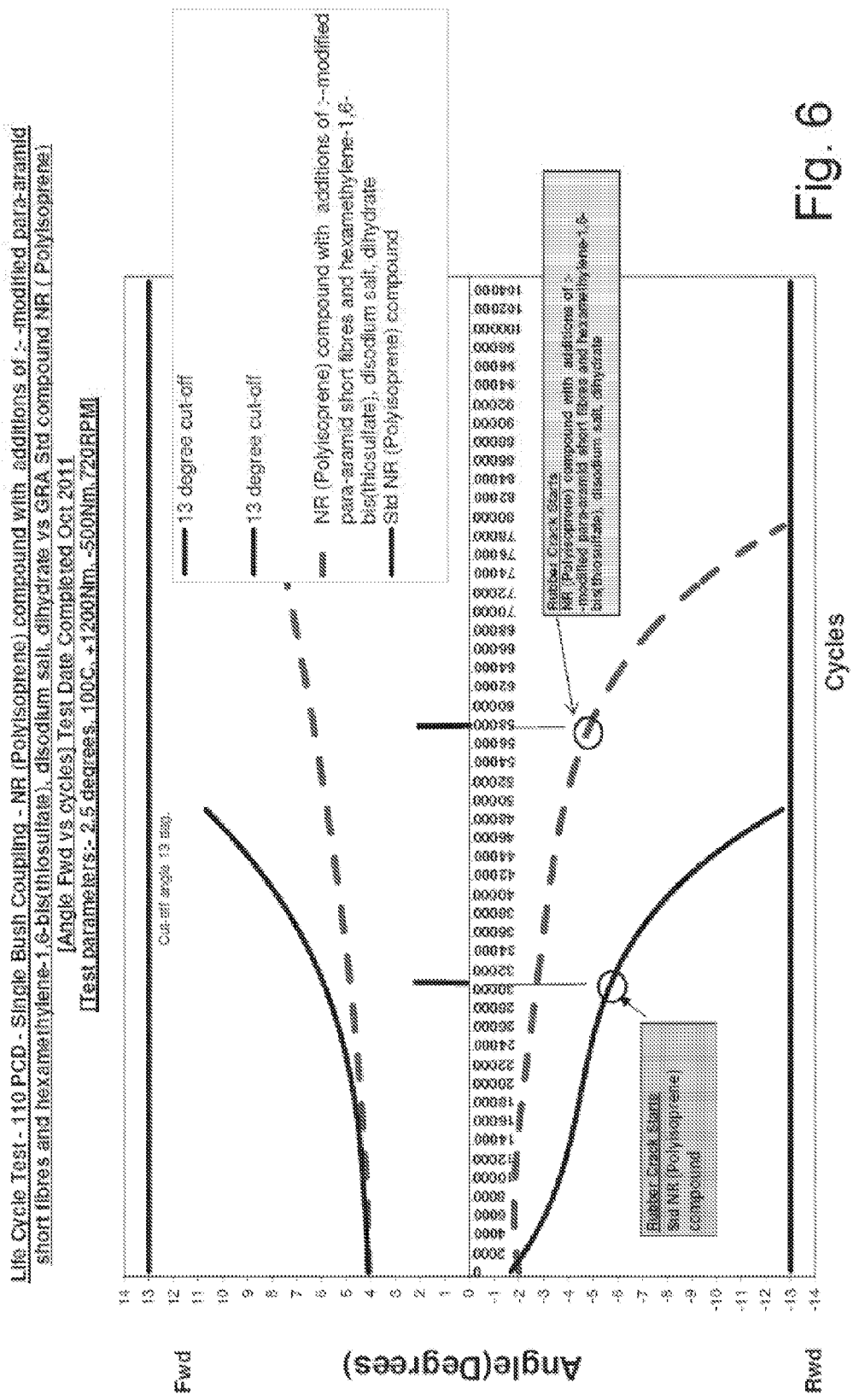
FIG. 6 shows a graph comparing a life test of a flexible disc-type coupling according to present invention with those of prior art couplings.
Figure 7:
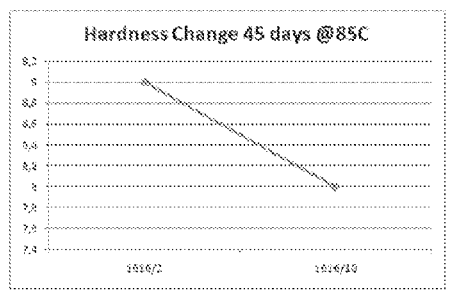
FIGS. 7 to 11 show a respective graph in which properties of a composition according to the present invention are compared with a prior art composition.
Figure 8:
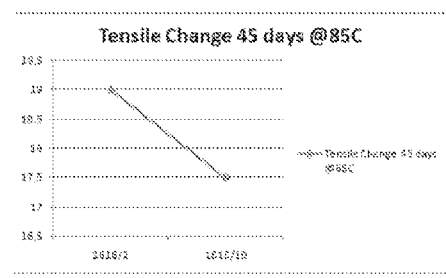
Figure 9:
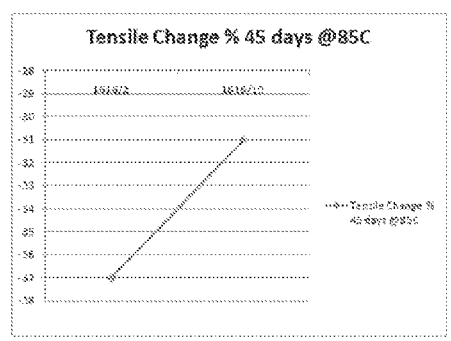
Figure 10:
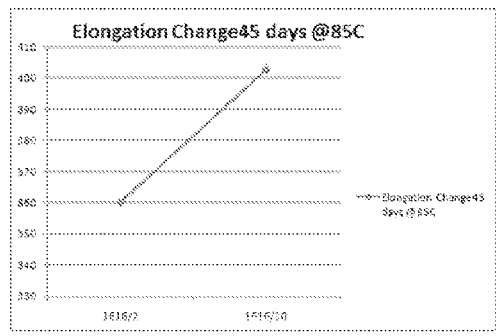
Figure 11:
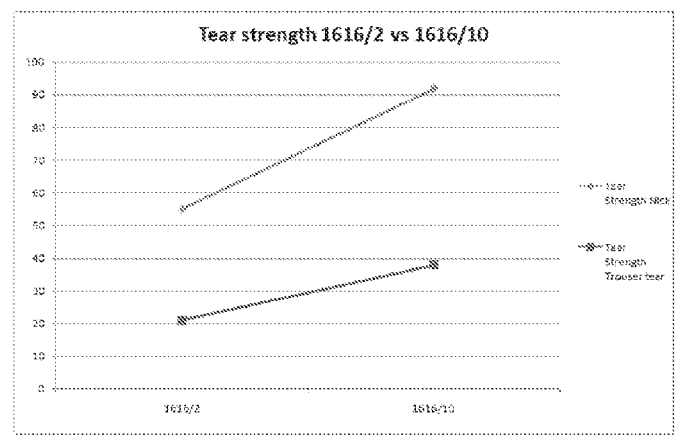

In the vehicle industry the appearance of rubber cracks in flex couplings is regarded as a failure point in couplings even if there is more life in the coupling, as the common test criteria is to 13 degrees angle of failure (see FIG. 6).

FIG. 6 shows a graph of angle degrees of failure with respect to working cycles of two couplings according to the present invention and two coupling according to the prior art.

The data from such graph demonstrates that known rubber couplings and couplings according to the present invention have the same life to angle failure at 13 degrees in reverse direction but in a coupling according to the present invention the rubber cracking commences at double the life cycles of the prior art couplings.

In such graph it is also shown that crack appearance in a standard coupling, i.e. comprising a NR (Polyisoprene) composition, starts at 30.000 cycles, whereas crack appearance using an improved coupling including a composition according to the present invention, such as NR (Polyisoprene) with addition of modified para aramid short fibers, starts at 58.000 cycles. Therefore, it is clear that with a composition according to the present invention, an improvement is obtained at a temperature at 100° C., and thus the composition according to the present invention has an improved heat resistance.

Figure 2:
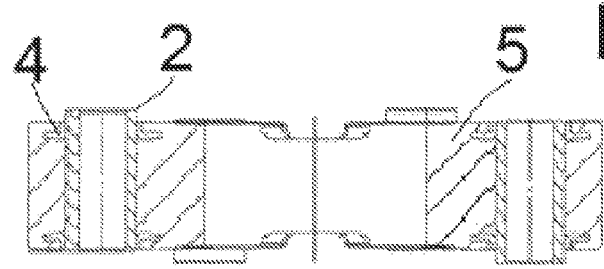
FIG. 2 is a diametric cross-section view of the coupling of FIG. 1.

FIGS. 12 to 15 show another coupling similar to the coupling of FIGS. 1 and 2, but including U-shaped elements 6 mounted each on a respective bushing 1, at an intermediate zone thereof, in such a way as each U-shaped element 6 delimits with the respective steel collars 4, a receiving zone 7, 8. More particularly, the U-shaped elements 6 include two circular flat elements 6a bridge connected by a tubular wall 6b, such wall 6b longitudinally extending from the inner edge of one flat element 6a to the inner edge of the other 6b, in such a way that between the flat elements 6a, 6b a channel or zone 9 for a respective portion of the yarns is delimited. The U-shaped element 6 are mounted with the tubular wall 6b coaxial with the side wall of the bushing 1, and with the circular flat elements 6a extending from the tubular wall 6b outwardly. Therefore, owing to the proviso of the U-shaped element, three zones are delimited for keeping in position the yarns:

the first zone 7 between one steel collar 4 and a respective circular flat element 6a;
the second zone 9 between the circular flat elements 6a; and
the third zone 8 between a respective circular flat element 6a and the other steel collar 4.

As it will be understood, a coupling according to the present invention provides potentially up to double the fatigue life prior to rubber cracks appearing in durability which provides a significant customer benefit of reduced warranties and improved operation.

The composition and coupling described above are susceptible to numerous modifications and variants within the protective scope defined by the following claims.

What is claimed is:

1. A composition comprising:
   at least one rubber component;
   50 parts of carbon black per hundred of said at least one rubber component;
   3 parts of modified para-aramid short fibre per hundred parts of said at least one rubber component; and
   3 parts of hexamethylene-1,6-bis(thiosulfate), disodium salt, dehydrate per hundred parts of said at least one rubber component.

2. A composition according to claim 1, characterized in that said at least one rubber component is selected from the group including polyisoprene, natural rubber or their mixtures.

3. A method of obtaining a composition comprising,
   at least one rubber component;
   from 49 to 51 parts of carbon black per hundred parts of said at least one rubber component;
   from 1 to 6 parts of modified para-aramid short fibre per hundred parts of said at least one rubber component; and
   from 1 to 6 parts of hexamethylene-1,6-bis(thiosulfate) disodium salt dehydrate per hundred parts of said at least one rubber component
   the method comprising the following steps:
   mixing rubber component, carbon black, and modified para-aramid short fibre; and
   subsequently mixing the mixture thus obtained with hexamethylene-1,6-bis(thiosulfate), disodium salt, dehydrate.

4. A flexible disc-type coupling comprising a disc body having a plurality of bushings, which are angularly spaced apart one with respect to the other along a circumference, each pair of adjacent bushings being connected by yarns wound around them, wherein said bushings and said yarns are incorporated in a matrix of a composition comprising,
   at least one rubber component;
   from 49 to 51 parts of carbon black per hundred parts of said at least one rubber component;
   from 1 to 6 parts of modified para-aramid short fibre per hundred parts of said at least one rubber component; and
   from 1 to 6 parts of hexamethylene-1,6-bis(thiosulfate) disodium salt dehydrate per hundred parts of said at least one rubber component.

5. A coupling according to claim 4, wherein said yarns are made of nylon.

6. A coupling according to claim 4, wherein said yarns comprise a plurality of nylon loops wounded around each pair of adjacent bushings.

7. A coupling according to claim 5, wherein said nylon yarns are assembled in a nest of forward and reverse loops.

8. A coupling as claimed in claim 4, wherein on at least one bushing, two end collars and an intermediate U-shaped element are mounted, in such a way three zones for keeping in position the yarns are delimited:
   the first zone between one end collar and said U-shaped element;
   the second zone between components of said U-shaped element; and
   the third zone between a component of the U-shaped element; and
   the other end collar.

* * * * *